Patented Feb. 12, 1935

1,990,854

UNITED STATES PATENT OFFICE 1,990,854

VAT AND SULPHUR DYESTUFF PREPARATION

Hermann Berthold, Leverkusen-I. G. Werk-on-the-Rhine, Germany, assignor to General Aniline Works, Inc., New York, N. Y., a corporation of Delaware No Drawing. Application December 14, 1931, Serial No. 581,071. In Germany December 19, 1930

20 Claims. (Cl. 8—6)

The present invention relates to new vat and sulphur dyestuff preparations suitable for printing purposes and to a process of printing textile fibers with these preparations.

In accordance with the invention beta-arylsulphamino-anthraquinones or substitution products thereof, or also reduction products of these substances which still contain oxygen in the meso-position, or mixtures of compounds of these types are employed to influence favorably the capacity for printing of vat or sulphur dyestuffs, that is, to improve the strength of the printings obtainable and at the same time the speed of fixation.

The further addition of anthraquinone, hydroxyanthraquinones, aminoanthraquinones, anthraquinone-sulphonic or carboxylic acids or reduction products of these compounds containing oxygen in the meso-position or salts of said compounds, still enhances the efficacy of the first mentioned products in many cases.

The beta-arylsulphamino-anthraquinones, and also the other anthraquinone derivatives or the reduction products of the same containing oxygen in the meso-position are preferably applied in a finely divided state for the purposes of the present process. This may be accomplished in a variety of ways. Thus, for example, the substances in question may be finely ground or they may be dissolved in sulphuric acid and reprecipitated with water.

The incorporating of the beta-arylsulphaminoanthraquinones or their reduction products containing oxygen in the meso-position with the vat or sulphur dyestuffs may be accomplished in a variety of ways. For example, the different constituents may be mixed in the dry state or in form of aqueous pastes; or the beta-arylsulphaminoanthraquinones etc. may be added to the printing colors at any stage of their manufacture. The best results are generally obtained when adding the compounds in question to aqueous pastes of the dyestuffs containing glycerine, or another suitable polyvalent water soluble alcohol, such as ethylene-glycol, diethyleneglycol, thiodiglycol, thiodiglycerol and the like. The pastes thus obtainable are very stable, do not deposit or dry up, do not form crusts and can be applied for printing purposes even after prolonged storing. In some cases it will be of advantage to work in the following manner: The dyestuff is suspended in water, glycerine or another water soluble polyvalent alcohol as mentioned above is added, and the dyestuff, reduced in this suspension by means of a reducing agent customarily employed in vat dyeing and in the presence of an alkali, such as caustic soda solution, caustic potash lye or preferably a weaker alkali, such as ammonia, sodium carbonate potassium carbonate or the like. As reducing agents alkali metal hydrosulphites are preferred, but other reducing agents such as titanium trichloride etc. are likewise operable. A beta-arylsulphaminoanthraquinone or a reduction product thereof containing oxygen in the meso-position is added to the preparations above mentioned at any desired stage of their manufacture. The dyestuff pastes thus obtainable containing the dyestuff in a reduced form (in the case of applying a rather weak alkali, such as ammonia, soda or potash, probably in the form of the free leuco acid) do likewise not deposit, do not congeal, do not form crusts, and for printing purposes, possess similar advantages as the preparations mentioned before.

Suitable beta-arylsulphamino-anthraquinones are, for example, those obtainable by condensing beta-aminoanthraquinone, 2.6-diaminoanthraquinone, 2.7-diaminoanthraquinone etc. with benzene sulphochloride, naphthalene sulphochlorides, homologues thereof, such as ortho-, meta- or para-toluene sulphochloride, xylene sulphochlorides etc.

The beta-arylsulphaminoanthraquinones in question correspond, for example, to the formulae:—

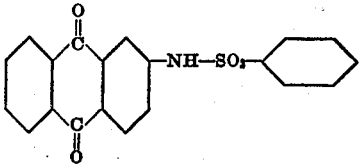

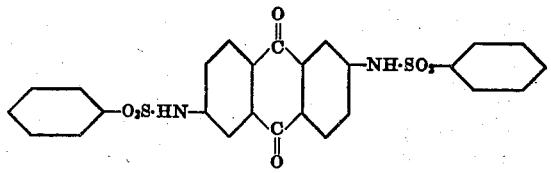

etc. Salt formation of these compounds takes place at the nitrogen atoms. Obviously, instead of the free arylsulphaminoanthraquinones themselves salts thereof, especially alkali metal salts (including the ammonium salts) may be applied, which salts are to be considered equivalents to the free arylsulphaminoanthraquinones.

Besides the beta-arylsulphaminoanthraquinones and/or their reduction products above specified, so-called hydrotropic agents may be added. By the term "hydrotropic agents" is understood compounds promoting the solubility of water insoluble or difficultly soluble substances in water (compare Neuberg, Biochemische Zeitschrift vol. 76, (1916) page 107 ff.; Tamba, Biochemische Zeitschrift vol. 145, (1924) page 415 ff.; Neuberg, Sitzungsberichte der königl. preuss. Akademie der Wissensch. 1916). Suitable hydrotropic agents are for example:—urea, substituted ureas, thiourea, hexamethylene-tetramine, the potassium salt of ethylether sulphonic acid or -methylether sulphonic acid, the ammonium or alkali metal salts of the following acids:—phenylacetic acid, benzoic acid, salicylic acid, the benzene sulphinic acids, the benzene sulphonic acids, the para-toluene sulphonic acid, naphthalene sulphonic acids, for example, naphthalene-1- or -2-sulphonic acid, aniline sulphonic acids and substitution products thereof, such as for example, dimethyl-metanilic- or diethylmetanilic acid, dimethyl-4-aminobenzoic acid, alkali metal salts of hydroaromatic carboxylic- and sulphonic acids, as for example, the cyclohexane carboxylic acid, tetra-hydronaphthalene-beta-sulphonic acid and the like.

It may be mentioned that the hydrotropic agent yielding the best result in a particular case will depend on the nature of the dyestuff to be printed as well as on the printing method applied.

For printing purposes the preparations described above are worked up to printing colors in any desired manner. For example, the dry preparations may be made up to aqueous pastes suitably in the presence of glycerine, ethylene glycol or another suitable polyvalent water soluble alcohol, a thickening of any desired composition is added, furthermore, caustic soda solution and sodium hydrosulphite, and the mixture is heated to 60° C., until the dyestuff has dissolved in the form of its leuco derivative. After cooling, sodium formaldehydesulphoxylate and potassium carbonate are stirred into the mixture. Cotton or another suitable textile product is printed with this printing color, the printings are steamed, for example, in a Mather-Platt apparatus and developed by a treatment with suitable oxidizing agents, such as oxygen (air), potassium bichromate and acetic acid and the like. Finally the printings are soaped while boiling.

Another method of printing with my preparations will be as follows:—

The powdery preparations are made up to an aqueous paste, a thickening, glycerine, potassium carbonate and sodium formaldehydesulphoxylate are added and textile products are printed with these printing colors containing the dyestuff in the unreduced state. The printings are steamed, whereby reduction of the dyestuff occurs, and further treated as described above. Instead of the powdery preparations the aqueous pastes thereof, which may contain glycerine, ethylene glycol, diethylene glycol, thiodiglycerol etc. may be applied, whereby in case that the pastes contain glycerine etc., a further addition of the latter when preparing the printing colors will be unnecessary in many cases but necessary in other cases, mainly depending on the type of the dyestuff applied. According to this process also my dyestuff preparations, obtained by reducing the dyestuffs in the presence of water, glycerine and an alkali, preferably one which is weaker than caustic alkali solutions, such as ammonia, sodium carbonate, potassium carbonate etc., may be worked up to printing colors and applied for printing purposes. It may be mentioned that also in this case the addition of a suitable reducing agent such as sodium formaldehyde sulphoxylate and of an alkali and in most cases of glycerine, thiodiglycol or the like, to the printing color will be necessary or at least advantageous in order to obtain the best results.

When using in the claims the term "vat or sulphur dyestuff preparations for printing purposes" the same is intended to include not only the dry dyestuff preparations of vat or sulphur dyestuffs as defined before, but also the corresponding printing colors or aqueous pastes of the dyestuffs with or without the addition of glycerine or other water soluble polyvalent alcohols, alkalies, reducing agents etc.

The following examples will illustrate the invention, without limiting it thereto, the parts being by weight:—

*Example 1:*—A printing paste is prepared from 20 parts of a 10% aqueous paste of 6.6'-diethoxy-2-2'-bisthionaphtheneindigo with the addition of 7 parts of glycerine, 1 part of 2-para-toluene sulphaminoanthraquinone or 2.6-di-para-toluene-sulphaminoanthraquinone (most finely ground), and 72 parts of a thickening containing in 1000 parts

|  | Parts |
|---|---|
| Wheat starch | 60 |
| Water | 150 |
| British gum powder | 60 |
| Industrial gum 1:1 | 260 |
| Tragacanth 65:1000 | 170 |
| Potassium carbonate | 150 |
| Sodium formaldehyde sulphoxylate | 150 |

This printing color prints considerably better and yields printings, which fix better and are of greater strength than the printings obtainable by the same printing color but without the addition of the para-toluene-sulphaminoanthraquinone or 2.6-di-para-toluene-sulphaminoanthraquinone. Valuable results are likewise obtained, in case the anthraquinone derivative is added to the dry dyestuff in a finely ground form with or without the addition of emulsifying agents or hydrotropic agents, or when the dyestuff is applied in form of a press cake or when the same is previously reduced by means of sodium hydrosulphite in the presence of water, glycerine or another similar water soluble polyvalent alcohol and ammonia.

*Example 2:*—The dyestuff of Example 1 may be replaced by the following dyestuffs:—

(1) The dyestuff from 6-methoxy-3-hydroxy-thionaphthene and 4-methyl-6-bromo-2.3-dihydro-3-keto-thionaphthene-2-(para-dimethylamino)-anil;

(2) The carbazole from 5.5'-dibenzoyldiamino-1.1'-dianthraquinonylamine;

(3) The carbazole from 4.5'-dibenzoyldiamino-1.1'-dianthraquinonylamine;

(4) The carbazole from 4.5'-dibenzoylamino-8'-methoxy-1.1'-dianthraquinonylamine;

(5) The dyestuff obtainable by oxidizing naphthooxythiophencarboxylic acid with potassium ferric cyanide in alkaline solution;

(6) 6.6'-dichloro-4.4'-dimethyl-bis-thionaphthene-indigo;

(7) 2.7-dibromoanthanthrone, (8) Brominated pyranthrone, (9) Alpha-isophthaloylaminoanthraquinone,

(10) 5.5'-dibenzoyldiamino-1.1'-dianthraquinonyloxamide,

(11) The dyestuff enumerated in Colour Index 1st. ed. under No. 969.

These dyestuffs likewise yield stronger prints and fix better, when printed in the presence of an arylsulphamino-anthraquinone than in the absence of such compound.

Instead of the arylsulphaminoanthraquinones mentioned in Example 1, beta-phenylsulphamino-anthraquinone, 2.6-diphenylsulphamino-anthraquinone, beta - xylylsulphaminoanthraquinones, 2.7-di-ortho-, -meta- or -para-tolyl-sulphaminoanthraquinone, alpha- or beta-naphthylsulphamino-anthraquinone etc. or salts of these compounds, such as the sodium- potassium- or ammonium salts may be applied with a similar effect.

It may be mentioned that as far as sulphur dyestuffs are concerned the best results are generally obtained when applying sulphur dyestuffs, which also without the addition of arylsulphaminoanthraquinones possess affinity to textile fibers in printing processes.

The above preparations yield especially good results in cotton printing, but may likewise be applied in the printing or slop-padding of other textile materials such as viscose, wool, silk, acetate silk mixed fabrics and the like.

I claim:—

1. Vat and sulphur dyestuff printing preparations for use on textile fibers comprising as a printing assistant a compound of the group consisting of beta-arylsulphamino-anthraquinones, substitution products thereof and such reduction products of these compounds as still contain oxygen in the meso-position.

2. Vat and sulphur dyestuff printing preparations for use on textile fibers comprising a hydrotropic agent and as a printing assistant a compound of the group consisting of beta-arylsulphamino-anthraquinones, substitution products thereof and such reduction products of these compounds as still contain oxygen in the meso-position.

3. Vat and sulphur dyestuff printing preparations for use on textile fibers comprising a water soluble polyvalent alcohol and as a printing assistant a compound of the group consisting of beta-arylsulphamino - anthraquinones, substitution products thereof and such reduction products of these compounds as still contain oxygen in the meso-position.

4. Vat and sulphur dyestuff printing preparations for use on textile fibers comprising a water soluble polyvalent alcohol, a hydrotropic agent and as a printing assistant a compound of the group consisting of beta-arylsulphamino-anthraquinones, substitution products thereof and such reduction products of these compounds as still contain oxygen in the meso-position.

5. Vat and sulphur dyestuff printing preparations for use on textile fibers comprising as a printing assistant a compound of the group consisting of beta-phenylsulphaminoanthraquinones, which may be substituted in the benzene nucleus by alkyl groups, and such reduction products of these compounds as still contain oxygen in the meso-position.

6. Vat and sulphur dyestuff printing preparations for use on textile fibers comprising a hydrotropic agent and as a printing assistant a compound of the group consisting of beta-phenyl-sulphamino-anthraquinones, which may be substituted in the benzene nucleus by alkyl groups, and such reduction products of these compounds as still contain oxygen in the meso-position.

7. Vat and sulphur dyestuff printing preparations for use on textile fibers comprising a water soluble polyvalent alcohol and as a printing assistant a compound of the group consisting of beta - phenylsulphaminoanthraquinones, which may be substituted in the benzene nucleus by alkyl groups and such reduction products of these compounds as still contain oxygen in the meso-position.

8. Vat and sulphur dyestuff printing preparations for use on textile fibers comprising a water soluble polyvalent alcohol, a hydrotropic agent and as a printing assistant a compound of the group consisting of beta-phenylsulpaminoanthraquinones, which may be substituted in the benzene nucleus by alkyl groups, and such reduction products of these compounds as still contain oxygen in the meso-position.

9. Vat and sulphur dyestuff printing preparations for use on textile fibers comprising glycerine, a hydrotropic agent and as a printing assistant a compound of the group consisting of beta-arylsulphamino-anthraquinones, substitution products thereof and such reduction products of these compounds as still contain oxygen in the meso-position.

10. Vat and sulphur dyestuff printing preparations for use on textile fibers comprising glycerine, a hydrotropic agent and as a printing assistant a compound of the group consisting of beta-phenylsulphamino - anthraquinones, which may be substituted in the benzene nucleus by alkyl groups, and such reduction products of these compounds as still contain oxygen in the meso-position.

11. A vat dyestuff printing preparation for use on textile fibers comprising 5.5'-dibenzoyldiamino - 1.1' - dianthraquinonylamine carbazole, glycerine and as a printing assistant a compound of the group consisting of 2-para-toluene-sulphaminoanthraquinone and 2.6-di-para-toluene-sulphaminoanthraquinone.

12. A vat dyestuff printing preparation for use on textile fibers comprising 6.6'-diethoxy-2.2'-bis-thionaphthene indigo, glycerine and as a printing assistant a compound of the group consisting of 2-para-toluene-sulphaminoanthraquinone and 2.6 - di - para-toluene - sulphaminoanthraquinone.

13. The process which comprises printing textile fibers with printing colors derived from dyestuffs of the group consisting of vat and sulphur dyestuffs, said colors containing as a printing assistant a compound of the group consisting of aryl-sulphaminoanthraquinones, substitution products thereof and such reduction products of these compounds as still contain oxygen in the meso-position.

14. The process which comprises printing textile fibers with printing colors derived from dyestuffs of the group consisting of vat and sulphur dyestuffs, said colors containing a hydrotropic agent and as a printing assistant a compound of the group consisting of arylsulphaminoanthraquinones, substitution products thereof and such reduction products of these compounds as still contain oxygen in the meso-position.

15. The process which comprises printing textile fibers with printing colors derived from dyestuffs of the group consisting of vat and sulphur dyestuffs, said colors containing a water soluble polyvalent alcohol and as a printing assistant a compound of the group consisting of arylsulphaminoanthraquinones, substitution products thereof and such reduction products of these compounds as still contain oxygen in the meso-position.

16. The process which comprises printing textile fibers with printing colors derived from dyestuffs of the group consisting of vat and sulphur dyestuffs, said colors containing a water soluble polyvalent alcohol, a hydrotropic agent and as a printing assistant a compound of the group consisting of arylsulphamino-anthraquinones, substitution products thereof and such reduction products of these compounds as still contain oxygen in the meso-position.

17. The process which comprises printing cotton with printing colors derived from vat dyestuffs said colors containing as a printing assistant a compound of the group consisting of beta-phenylsulphamino-anthraquinones, which may be substituted in the benzene nucleus by alkyl groups, and glycerine.

18. The process which comprises printing cotton with printing colors derived from vat dyestuffs, said colors containing a hydrotropic agent and as a printing assistant a compound of the group consisting of beta-phenylsulphaminoanthraquinones, which may be substituted in the benzene nucleus by alkyl groups, and glycerine.

19. The process which comprises printing cotton with a printing color derived from 5.5'-dibenzoyldiamino-1.1'-dianthraquinonylamine carbazole, said color containing glycerine and as a printing assistant a compound of the group consisting of 2-para-toluenesulphaminoanthraquinone and 2.6-di-para-toluene-sulphaminoanthraquinone.

20. The process which comprises printing cotton with a printing color derived from 6.6'-diethoxy-2.2'-bis-thionaphthene indigo, said color containing glycerine and as a printing assistant a compound of the group consisting of 2-paratoluene-sulphaminoanthraquinone and 2.6-di-para-toluene-sulphaminoanthraquinone.

HERMANN BERTHOLD.